United States Patent [19]

Barnes

[11] Patent Number: 5,238,264
[45] Date of Patent: Aug. 24, 1993

[54] DEPLOYMENT DOOR FOR AIR BAG

[75] Inventor: William J. Barnes, Clarkston, Mich.

[73] Assignee: General Motors Corporation, Detroit, Mich.

[21] Appl. No.: 835,890

[22] Filed: Feb. 14, 1992

[51] Int. Cl.5 .............................................. B60R 21/16
[52] U.S. Cl. ..................................... 280/732; 16/226; 49/381
[58] Field of Search ................... 280/732, 743, 743 R; 49/381; 16/226, 366, 387

[56] References Cited

U.S. PATENT DOCUMENTS 3,794,349  2/1974  Fuller ................................ 280/732
4,925,209  5/1990  Sakurai .............................. 280/743

Primary Examiner—David M. Mitchell
Assistant Examiner—Andrew C. Pike
Attorney, Agent, or Firm—Charles E. Leahy

[57] ABSTRACT

The door assembly for an air bag opening includes a door having a rigid substrate panel extending across the opening and carrying a decorative trim to normally conceal the air bag opening. A primary hinge acts between an edge of the rigid substrate panel and the vehicle to enable opening movement of the door about an axis defined by the primary hinge means. The rigid substrate panel has a weakened portion extending across the panel in parallel spaced relation from the primary hinge axis to enable folding of the door by the deploying air bag about a secondary hinge axis defined by the weakened portion. The primary hinge means is preferably a hinge panel of rigid but bendable metal construction which extends into engagement along the underside of the rigid substrate panel into proximity with the weakened portion thereof so that the rigid hinge panel reinforces the portion of the door underlaid by the hinge strap. Upon deployment of the air bag, the door pivots about the primary hinge axis while the portion of the door extended beyond the secondary hinge axis is enabled to pivot further and faster than the opening movement of the other portion of the door and then upon any contact with the windshield, the door may continue to bend about the secondary hinge axis.

3 Claims, 2 Drawing Sheets 5,238,264

DEPLOYMENT DOOR FOR AIR BAG

The invention relates to a deployment door for a vehicle air bag and more particularly to an improved yieldable door.

BACKGROUND OF THE INVENTION

It is well known in motor vehicles to mount an air bag beneath the instrument panel for deployments through an opening in the instrument panel. The opening in the instrument panel is conventionally closed by a deployment door which is hingedly mounted on the vehicle body instrument panel by a hinge defining a transversely extending hinge axis. It is also known in the prior art that the hinge may be defined by a flexible or elastic strap, or a convoluted metal strap which hinges the door in a manner by which the door shifts bodily upward and out of the opening to facilitate the deployment of the air bag through the opening.

It would be desirably to provide a new and improved door assembly which would be substantially rigid to conceal and protect the undeployed air bag, and yet have improved kinematics which upon deployment would maximize the opening rate of the door and would yield and absorb energy to minimize any interaction with the vehicle windshield upon over travel of the deployment door.

SUMMARY OF THE INVENTION

According to the invention the door assembly for an air bag opening includes a door having a rigid substrate panel extending across the opening and carrying a decorative trim to normally conceal the air bag opening. A primary hinge acts between an edge of the rigid substrate panel and the vehicle to enable opening movement of the door assembly about an axis defined by the primary hinge means. The rigid substrate panel has a weakened portion extending across the panel in parallel spaced relation from the primary hinge axis to enable folding of the door by the deploying air bag about a secondary hinge axis defined by the weakened portion. The primary hinge is preferably a hinge panel of rigid but bendable metal construction which extends in engagement along the underside of the rigid substrate panel into proximity with the weakened portion thereof so that the rigid hinge panel reinforces the portion of the door underlaid by the hinge strap. Upon deployment of the air bag, the door pivots about the primary hinge axis while the portion of the door extending beyond the secondary hinge axis is enabled to pivot further and faster than the opening movement of the other portion of the door and then upon any contact with the windshield, the door may continue to bend about the secondary hinge axis.

Accordingly, the principle object, feature, and advantage of the invention resides in the provision of an air bag deployment door having a primary hinge mounting the door on the vehicle body and a secondary hinge interposed in the door in spaced relation from the primary hinge to enable the door to fold during deployment of the bag and interaction with the vehicle windshield upon over travel of the door.

BRIEF DESCRIPTION OF THE DRAWINGS

These and other features, objects, and advantages of the invention will become apparent upon consideration of the description of the preferred embodiment and appended drawings in which.

Figure 1:
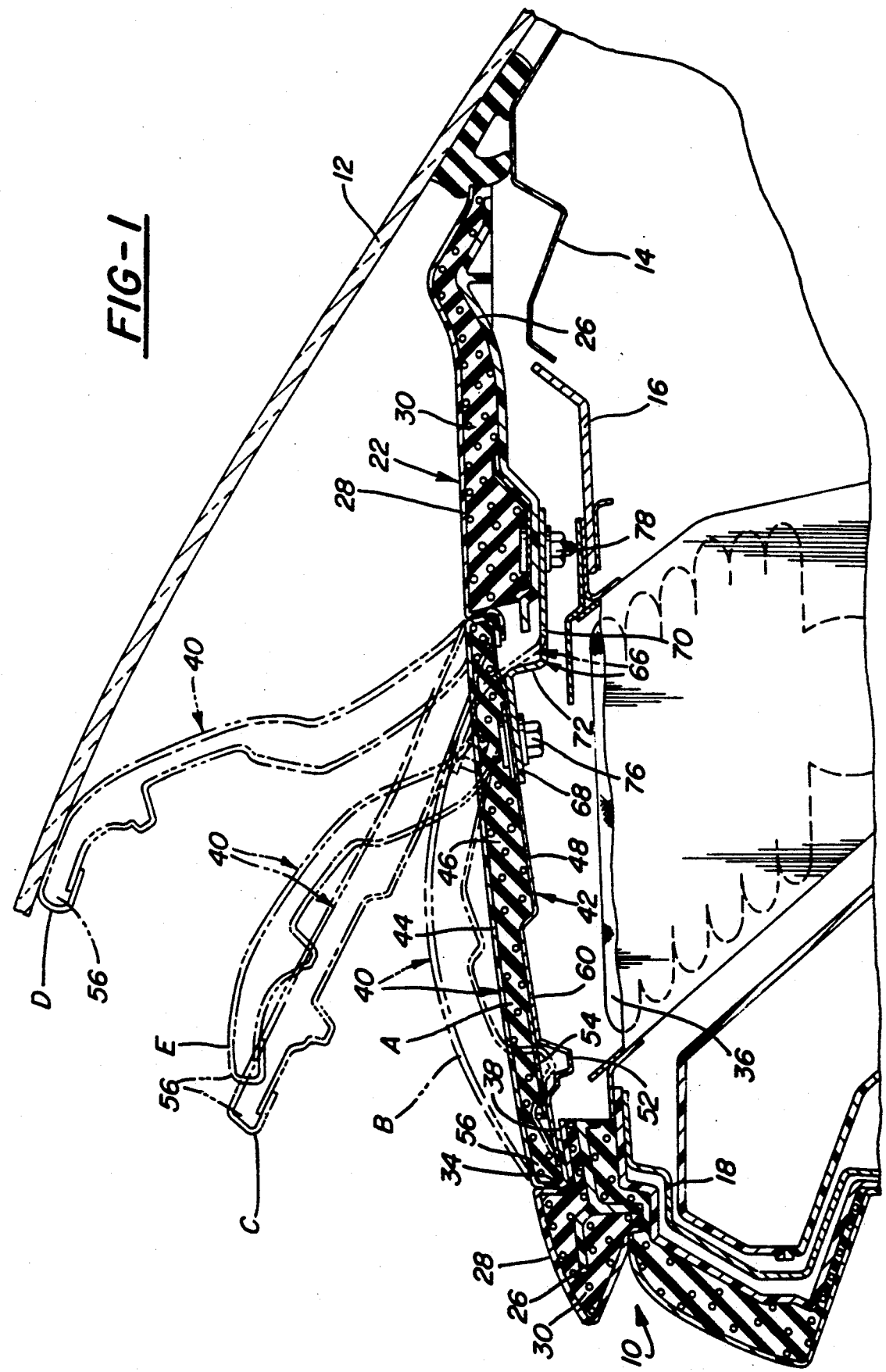
FIG. 1 is a section view through a vehicle instrument panel showing (a) a solid-line indicated closed position (A) of the door.
Figure 2:
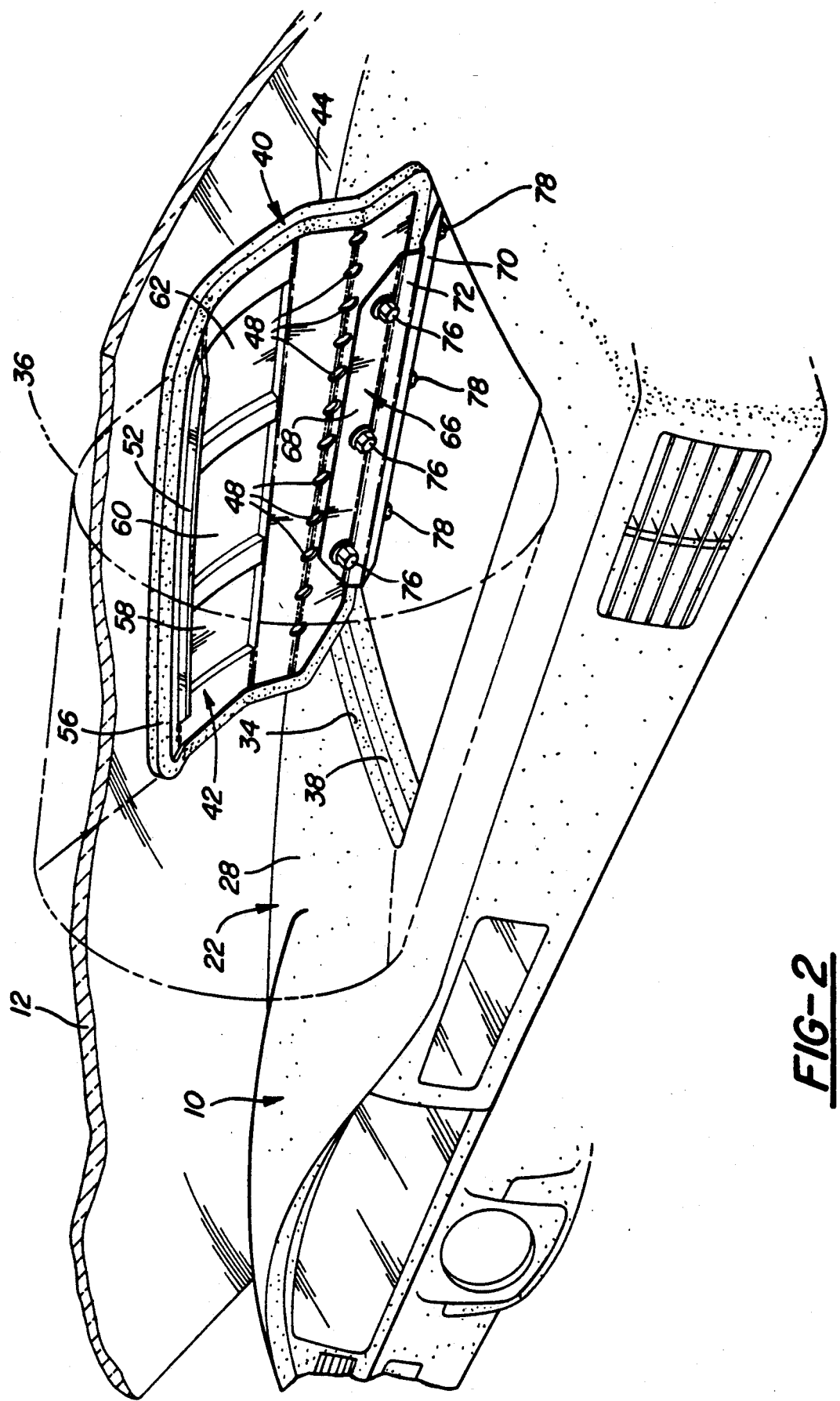

(b) a phantom-line indicated position (B) in which the door has begun to travel in the opening direction and the door beginning to fold and arch upwardly;

(c) a phantom-line indicated position (C) in which the door is traveling in the opening direction and has begun to fold on itself in the direction opposite to the upward arched position (B);

(d) a phantom-line indicated position (D) in which the door has over traveled into engagement with the windshield;

(e) a phantom line indicated position (E) in which the door is poised at its post-deployment position after the air bag has been fully deployed; and FIG. 2 is a perspective view of the door corresponding to the phantom line indicated position (D) of FIG. 1 and engaging the windshield.

DESCRIPTION OF THE PREFERRED EMBODIMENT

Referring to FIGS. 1 and 2 it is seen that a vehicle body includes an instrument panel 10 and a windshield panel 12. As best seen in FIG. 1 the instrument panel structure of the vehicle is supported by sheet metal stampings 14, 16, and 18 which are suitably welded and bolted together to provide a rigid understructure. The panel 10 also has an instrument panel cover 22 which includes a molded plastic base panel 26, a layer of decorative trim 28, and a cushion of foam 30 which is molded in place between the base panel 26 and the decorative trim 28. The instrument panel 22 has a rectangular opening 34 therein through which an inflatable air bag 36 is deployed to restrain the vehicle occupant. The opening 34 has a shelf 38 extending around its periphery.

An air bag deployment door 40 is hingedly mounted on the instrument panel cover 22 to close the air bag opening 34. The deployment door 40 is comprised of a stamped sheet metal substrate panel 42 and a decorative trim cover 44 having a layer of foam 46 molded in place therebetween. The substrate panel 42 is generally rectangular in shape and underlies the entire extent of the door 40. A plurality of apertures 48 are displayed in a row along the panel 42 to weaken the door 40 in a manner which will permit folding and bending of the door as will be described hereinafter. In addition, the panel 42 has a transverse extending stiffening rib 52 struck downwardly therefrom and extending along the rearward edge of the door 40 as best seen in FIG. 2. As shown in FIG. 1 a reinforcement plate 54 bridges across the reinforcing rib 52 and is suitably welded to the panel 42. The reinforcing rib 52 is spaced somewhat from the rearwardmost edge of the door 40 to define a rear tip portion 56 of the door. In addition a plurality of slightly raised ribs 58, 60, and 62 may be provided in the substrate panel 42 and cooperate with the rib 52 to stiffen the door somewhat against bending.

The deployment door 40 is hingedly mounted on the instrument panel by a hinge strap or panel 66. As best seen in FIG. 1, the hinge strap 66 is Z-shaped and includes a door leg 68 which extends to underlie the door panel 42, a vehicle leg 70 which extends into engagement with the base plate 26 of the instrument panel 10, and a vertical extending step 72 which connects door leg 68 and vehicle leg 70. The door leg 68 is attached to the substrate panel 42 of the door 40 by a plurality of nut and bolt assemblies 76. The vehicle leg 70 is similarly attached to the instrument base panel 26 by a plurality of nut and bolt assemblies 78.

FIG. 1 shows the solid-line indicated closed position "A" of the door. The door is retained in this position by the periphery of the door 40 resting upon the shelf 38 defined around the door opening 34. In addition, an adhesive or other releasable fastener may be employed, particularly at the rear tip portion 56 of the door 40 to secure the door against vibration. The fastener may also be provided by having the door 40 enlarged within an undercut or lip of the panel cover 22. In the closed position, the door 40 has considerable strength to support the door during normal use of the instrument panel by the vehicle user.

The phantom-line indicated positions "B" through "E" of FIG. 1 show the movement of the door 40 during deployment of the air bag 36. As the bag deploys, the door is rapidly forced opened and the hinge panel 66 defines a primary hinge axis about which the door may rotate. The hinge panel 66 begins to stretch as permitted by the progressive unfolding of the convolutions of the shape of the hinge panel as well as the bending of the vehicle leg 70 so that the door 42 rises above the opening 34 to expedite the deployment of the air bag. In addition, the deployment force of the bag applied to the door 40 is able to begin bending and folding of the door 40 about a secondary axis defined by the row of apertures 48. During this opening movement, the stiffening rib 52 provides sufficient lateral stiffness to provide uniform deformation of the panel 42.

The initial opening movement of the door 40 from the closed position "A" is shown at position "B" in which the deploying air bag has caused the door to become arched upwardly as expedited by the folding about the second axis defined by the row of apertures 48. During this initial bending the rear tip portion 56 of the door breaks away from the panel cover 22 as permitted by the breakaway of the adhesive or other interlock between the rear portion 56 and the panel cover 22.

The phantom-line indicated position designated "C" shows further opening movement of the door 40 in which the deployment of the bag has begun to cause the door 40 to bend further about the secondary axis defined by the row of apertures 48 but in the direction opposite to the upward arch of position "B". In this manner, the presence of the secondary axis permits the larger part of the door which extends rearwardly from the row of apertures 48 to swing about the secondary axis further and faster than the part of the door closer to the hinge strap 66 and thereby expedite and maximize the opening of the door 40.

The phantom-line indicated position designated "D" shows that the momentum of the door in the opening direction may cause overtravel of the door resulting in contact of the door with the windshield. The phantom-line position "D" shows that the rear tip portion 56 of the door 40 extending more rearward than the stiffening rib 52 may bend so that the door assumes a more planar area of contact with the windshield to distribute impact force across a broader area while the deformation of the metal and foam absorbs impact energy. Furthermore, it will be understood that upon contact of the door 40 with the windshield panel 12, the panel 42 may begin to bend again about the row of apertures 48 to further absorb the momentum of the door.

The phantom position designated "E" shows the springback of the door from the overtravel position "D" to a final post-deployment position. The door retains some deformation at the secondary axis defined by the row of apertures 38 and also retains some deformation of the rear tip portion 56 where contact was had with the windshield 12. The door 40 and hinge panel 66, as well as perhaps the panel cover 22, are removed and replaced with a new door and hinge.

Thus it is seen that the invention provides a new and improved deployment door. It will be understood that a person skilled in the art may make modifications to the preferred embodiment shown herein within the scope and intent of the appended claims. For example, while the secondary hinge axis is shown as defined by a row of apertures, other hinge forming structures are equally applicable. For example, the substrate panel 42 may be struck with a die to form a thinner sheet metal section defining an integral hinge. Or, the panel 42 may be stamped to include stiffening ribs extending longitudinally in both directions from the secondary hinge axis and that the absence of any such ribs at the defined location of the hinge will permit bending along the line thereof which is not reinforced by ribs. In addition, the substrate panel may be of molded plastic construction, in which case the hence and/or the stiffening ribs may be milled in place. Furthermore, it is seen in the preferred embodiment the secondary hinge axis is defined by providing the row of apertures at a position on the panel so that the door is divided into portions respectively two-thirds and one-third the length of the door. It may be desirable to relocate the secondary hinge axis in either direction from this location depending upon the particular air bag and vehicle geometries.

In addition, it will be understood that the various positions of the door shown in FIG. 1 are merely illustrative of the folding and bending of the door about the secondary axis, and that the bending and folding will vary somewhat depending upon variables such as the force of air bag deployment, the particular construction details of the door, the strength of the fastener holding the door closed, and the relative angles of the door and windshield.

The embodiments of the invention in which an exclusive property or privilege is claimed are defined as follows:

1. A door assembly for closing an air bag opening in a vehicle comprising:
   a door having a rigid substrate panel extending across the opening and a decorative trim carried thereon to normally conceal the air bag opening,
   a hinge strap acting between an edge of the rigid substrate panel and the vehicle to enable the deploying air bag to pivot the door assembly about an axis defined by the hinge strap,
   said rigid substrate panel having a weakened portion extending across the panel to enable the deploying air bag to yieldably fold the door about an axis defined by the weakened portion,
   and said hinge strap being a rigid panel underlying a portion of the rigid substrate panel and fixedly attached thereto so that the rigid hinge strap reinforces the portion of the door underlaid by the hinge strap.

2. A door assembly hingedly mounted on a vehicle for opening movement about a hinge axis to open and close an air bag deployment opening of the vehicle, comprising:

a door having a relatively rigid bendable substrate panel extending across the opening and a decorative trim carried thereon to normally conceal the air bag opening, said rigid substrate panel having a weakened portion extending across the panel in parallel spaced relation from the hinge axis to define a fold axis about which the door may yieldably bend, and a hinge panel having a vehicle leg attached to the vehicle and a door leg attached to the door and extending into underlying engagement with a portion of the substrate panel intermediate the hinge axis and the weakened portion to reinforce the underlaid portion of the door, whereby upon deployment of the air bag the vehicle leg of the hinge panel reinforces the underlaid portion of the door against bending and the deployment force is absorbed by the folding of the door about the fold axis and the further bending and yielding of a portion of the door not underlaid by the door leg of the hinge.

3. The door assembly of FIG. 2 further characterized by the door having a yieldable tip portion at an end thereof further from the hinge panel to bend and yield in the event of contact thereof with a windshield panel of the vehicle.

* * * * *